Figure 1:
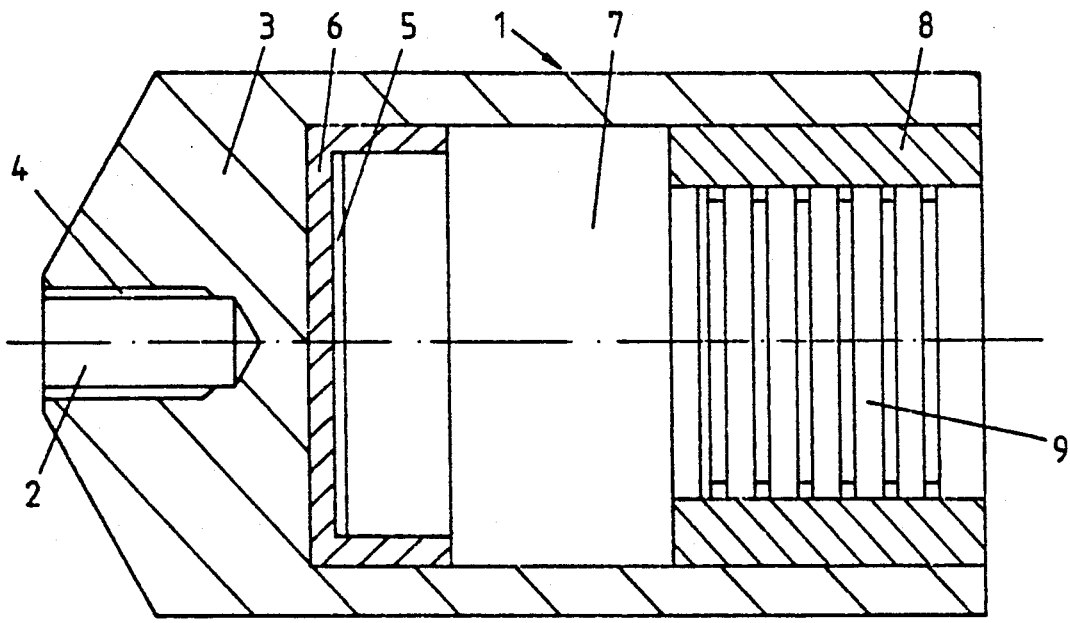

United States Patent [19]

Vermeiren et al.

[11] Patent Number: 5,083,462
[45] Date of Patent: Jan. 28, 1992

[54] PROCESS AND DEVICE FOR DETECTING DEFECTS IN MOVING PARTS HAVING A CENTRAL ROTATING SHAFT

[75] Inventors: Karel N. Vermeiren, Woerden; Hendrik Dolfsma, Tull end Waal, both of Netherlands

[73] Assignee: SKF Industrial Trading & Development Co., Nieuwegein, Netherlands

[21] Appl. No.: 365,808

[22] Filed: Jun. 14, 1989

[30] Foreign Application Priority Data

Aug. 11, 1988 [NL] Netherlands ............... 8802002

[51] Int. Cl.⁵ .................. G01H 1/00; G01M 13/04
[52] U.S. Cl. ........................... 73/587; 73/660; 73/593
[58] Field of Search ............ 73/660, 587, 602, 593, 73/579

[56] References Cited

U.S. PATENT DOCUMENTS 3,930,405 1/1976 Renken, Jr. .................. 73/587
4,768,380 9/1988 Vermeiren et al. ............. 73/660

FOREIGN PATENT DOCUMENTS 14476 2/1977 Japan ........................... 73/587
1442856 12/1988 U.S.S.R. ......................... 73/593

Primary Examiner—Hezron E. Williams
Assistant Examiner—Craig Miller
Attorney, Agent, or Firm—Rosen, Dainow & Jacobs

[57] ABSTRACT

An apparatus and method for detecting defects in moving parts having a central rotating shaft, in particular shaft bearings, with the aid of an acoustic-electric transducer converting the mechanical acoustic vibrations received into electric signals to be processed in a signal processing circuit to signals indicative of the status of the parts, the improvement wherein the acoustic-electric transducer is centrally disposed on one end of the shaft so that it rotates therewith and receives vibrations therefrom, and wherein the acoustic-electric transducer comprises a piezoelectric element, and an amplifier having its control terminal coupled to the pass filter.

7 Claims, 1 Drawing Sheet

PROCESS AND DEVICE FOR DETECTING DEFECTS IN MOVING PARTS HAVING A CENTRAL ROTATING SHAFT

The invention relates to a process for detecting defects in moving parts having a central rotating shaft, in particular shaft bearings, with the aid of an acoustic-electric transducer converting the mechanical acoustic vibrations received into electrical signals to be processed in a signal processing circuit into signals indicating the status of the parts, as well as to a device for practicing said process.

Such a process and device are disclosed in applicant's co-pending Netherlands Patent Application 85 03294 now U.S. Pat. No. 4,768,380. The acoustic-electric transducer in that case is fixed to a stationary, non-moving part, for example the housing of a shaft bearing. In that known system, the signals from the transducer, after band filtering and amplifying, are passed to a multiplier to the second input whereby a fixed frequency is supplied by a frequency generator. The output of the multiplier is filtered through a low-pass filter, and the amplitude increment of the signal obtained is indicative of a defect in the bearing.

Such a system is suitable for selective control, whereby the indicating signal obtained is referred to a number of standard references in a comparator circuit. For accurate absolute measurements, such a system is less appropriate, considering that, for example when measuring a ball bearing, dampings occur on the outside of the housing due to mutual contact of the moving parts found therein. In a ball bearing, for example, the points of contact of maximum stress are normally on the inner races of such a bearing. Vibrations due to defects occurring therein are damped by the respective transitions from inner race to balls, from balls to outer race, and from outer race to housing.

One solution to this would be to fix the acoustic-electric transducer, not on the outside but on the inside, that is, on the rotating shaft. However, the problem then remains to convey the signals obtained to the outside without noise interference.

According to the invention, it has now been found that it is possible to measure a shaft bearing, for example, with an acoustic-electric transducer directly on the rotating shaft, provided provision is made for the electric charges generated as a result of acoustic vibrations so that they are first converted into fluctuations of a direct current.

For that purpose, the invention provides a process, as outlined in the introduction, characterized in that the acoustic-electric transducer is fixed centrally co-rotate at one end of the shaft and converts the vibrations received into fluctuations in the current from a source, which are then coupled out for further processing by way of a rotating electric contact.

The invention further provides a device for practicing the process, characterized in that the acoustic-electric transducer consists of a piezoelectric element connected in a high-pass filter and coupled to the control gate of a current amplifier element, which is connected to a direct-current source by way of the rotating contact.

In the invention, advantageous use may be made of modern rotational connectors, connecting rotating conductors to fixed conductors with the aid of mercury contacts. An example of a connector suitable for use with the invention is the so-called Mercotac ® connector by Sillner Maschinenbau GmbH. According to the invention, the direct current is passed by way of the rotating contact to the co-rotating circuit of the acoustic-electric transducer, where the current is varied by the current amplifying element by way of the control gate in accordance with the signals received.

Expediently, the current amplifying element in the case of the invention may be a field effect transistor, with its input and output connected to the source of current and its control gate to the piezoelectric element.

With a view to signal processing, the alternating-current component of the current must be separated from the direct-current component, and for this purpose the invention further provides that the direct-current source be connected to the current amplifier by way of a resistance, and the voltage fluctuations across this resistance be capacitively coupled out for further processing into indicating signals.

Figure 2:
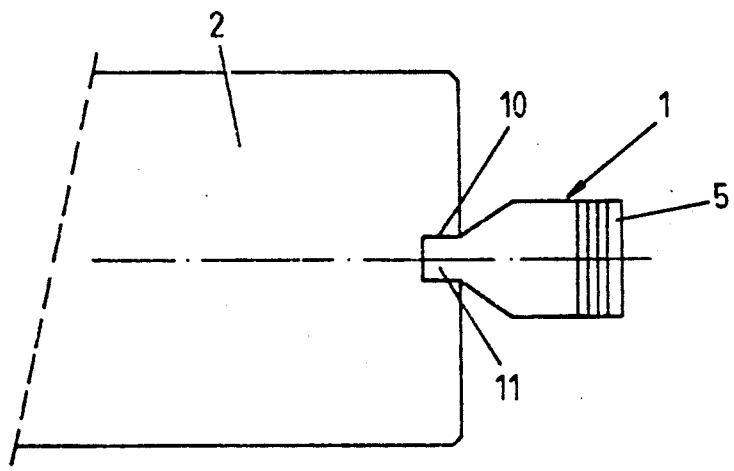
Figure 3:
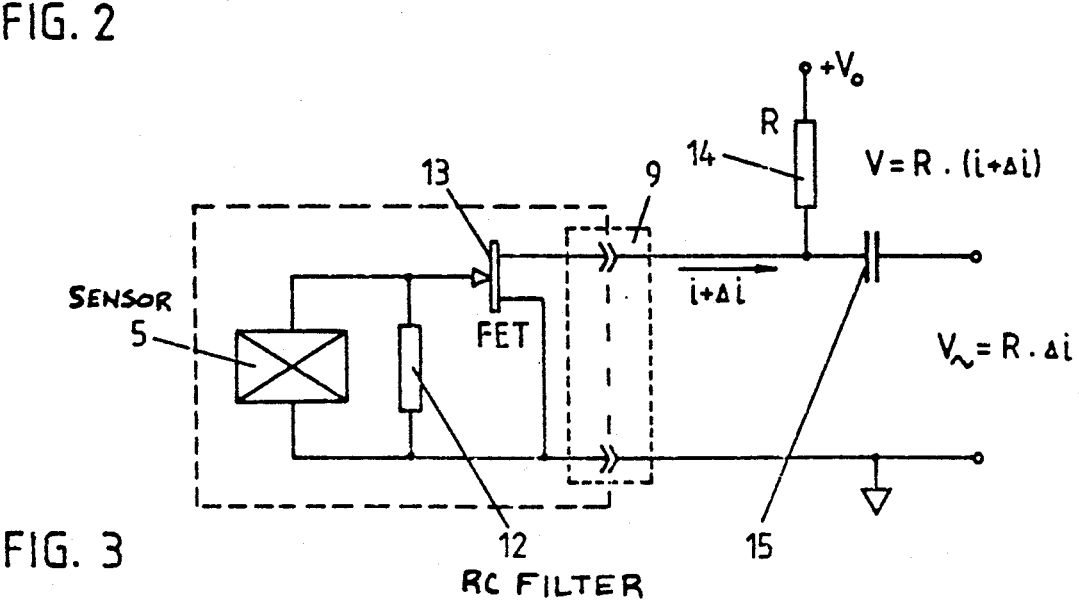

The invention will now be illustrated in more detail in terms of an embodiment with reference to the drawing by way of example. In the drawing, FIG. 1 shows, to an enlarged scale, a sectional view of a first embodiment of a transducer means according to the invention, FIG. 2 schematically shows a second embodiment, FIG. 3 shows a schematic circuit diagram of the transducer according to the invention, FIG. 1, to an enlarged scale, shows a section of an embodiment of the acoustic-electric transducer according to the invention, generally designated by 1. This device is mounted on a projecting shaft 2 of a shaft bearing (not shown) the vibrations whereof are to be measured for timely identification of adverse signals due to incipient defects in the bearing. The transducer has a cylindrical housing 3 with a central recess 4 in its anterior end, intended to accept the end of the shaft 1, so that when the shaft rotates, the housing with the parts contained therein rotates with it.

In the housing 3, a piezoelectric sensor element 5 is accommodated, being protected in front by insulation 6. Behind the piezoelectric element there is a hollow chamber 7 in which the electronic circuit of the transducer is accommodated. Behind this there is a connection socket 8 into which is plugged a rotating contact 9. This contact comprises a connector capable of establishing a conductive connection between a rotating part and a stationary part. A suitable example of such a connector is the so-called Mercotac ® connector.

FIG. 2 schematically shows an alternative embodiment in which the electro-acoustic transducer is placed, not on but in the shaft of a bearing or other rotating system to be measured. In this last embodiment, the shaft 2 is provided at its end with a central axial hole 10, and the transducer system, instead of a recess, has a projection 11 intended to be placed in the central axial hole 10. This embodiment is intended for shafts of larger diameter, the first embodiment being more suitable for shafts of small diameter.

FIG. 3 indicates the electronic circuit used for such transducer systems. The piezoelectric sensor 5 is part of an RC high-pass filter, schematically indicated by a resistance 12 connected in parallel across the piezoelectric element 5.

The output of the piezo element is coupled to the control gate of a field effect transistor 13, the input and output of which are connected by way of the rotating contact 9 to a supply voltage $V_o$ coupled to the test circuit by way of a resistance 14. So that the alternating-current component due to the signals from the piezoelectric element 9 can be uncoupled from the voltage connected by way of the resistance R, a condenser 15 is provided.

The acoustic transducer described above operates as follows. If vibrations arise owing to rotation of the shaft 1 in the bearing, they are picked up by the piezoelectric element 5 and converted into electric pulses which by way of the control gate of the field effect transistor 13, cause the current passing through it from the source voltage $V_o$ to fluctuate. By way of the rotary coupling 9, having a very low resistance, this current is carried off across the resistance 14. If this resistance 14 has a value R, there will be a voltage $V = R(i + \Delta i)$ across it, of which $V = Ri$ is the direct-current component and $V = R\Delta i$ is a fluctuating alternating-current component representative of the signals received by the piezoelectric element. This latter component $V\sim = R \cdot \Delta i$ is capacitively coupled out by way of the condenser 15 and may then be further processed, for example for registration on an oscilloscope or signal recorder.

With the device according to the invention, sensitive and accurate measurements are possible, with a minimum of noise interference. This is because, contrary to known systems, the measurements are not taken from a stationary part of a rotating system, but directly on the central rotating shaft of the system. In the case of a shaft bearing, as remarked earlier, the highest load is in the center of the bearing, and that is where incipient defect signals would be expected. For in measuring on the outside, a good deal of damping occurs from the inside out, but by measuring over the shaft in accordance with the invention, this damping is eliminated. Hence a sensitive and reliable measurement is obtained, fully representative of the status of the bearing to be measured.

Characteristic curves of measurements performed on the shaft of a bearing with the device according to FIG. 1. These curves were recorded on a time recorder and represent voltage-time graphs. One curve, the first, was recorded with non-rotating shaft. Two others, a second and third curve, were recorded with shaft rotating.

In the first curve, of course, only very little noise response is perceptible. The second curve was a recording at a speed of 1600 revolutions per minute, and here again there is only very little noise, indicating that the bearing is in good condition.

The third curve was a recording taken at a shaft speed of 2000 rpm, likewise with a damaged bearing cage. In this case there is a quite appreciable noise amplitude, which is easily interpreted. With such a device, then, it is possible in a convenient and simple manner to monitor, control or measure up a shaft bearing or other rotating system by way of its shaft. An essential feature of the invention is that the measurements always be taken during rotation, centrally on the rotating shaft, and co-rotating, that the signals received in the rotating part of the rotating system be already converted into current variations of a direct current, capable of being conveyed without loss or noise to an outside stationary system by way of modern rotating contacts, for example mercury connectors such as Mercotac ® connectors in order to be processed into indicating signals.

Although the invention has been described above in terms of a single embodiment with a variation, it will be apparent that changes and modifications are possible. Thus for example the output signals may be compared with alarm thresholds, in order to provide for alarm signals, possibly signals to stop a rotary drive system in order to avoid an emergency, etc. These and other modifications of the device according to the invention will be clear to those skilled in the art from the above.

We claim:

1. A process for detecting defects in moving parts having a central rotating shaft, in particular shaft bearings, with the aid of an acoustic-electric transducer converting the mechanical acoustic vibrations received into electric signals to be processed in a signal processing circuit to signals indicative of the status of the parts, the improvement wherein;
    centrally positioning said acoustic-electric transducer on one end of said shaft so that it rotates therewith and receives vibrations therefrom,
    converting the vibrations received by said transducer from the shaft into electric signals,
    transmitting said electric signals to an exterior signal processing circuit which processes said electric signals in said signal processing circuit to determine the existence of defects in said moving parts.

2. An apparatus for detecting defects in moving parts having a central rotating shaft, in particular shaft bearings, with the aid of an acoustic-electric transducer converting the mechanical acoustic vibrations received into electric signals to be processed in a signal processing circuit to signals indicative of the status of the parts, the improvement wherein;
    said acoustic-electric transducer is centrally disposed on one end of said shaft so that it rotates therewith and receives vibrations therefrom, and wherein,
    said acoustic-electric transducer comprises;
        a piezoelectric means,
        a high pass filter means coupled to said piezoelectric means,
        an amplifying means having a control terminal, said high pass filter means coupled to said control terminal, and
    terminal means for coupling said signal processing circuit to said amplifying means.

3. An apparatus according to claim 2, further including
    rotating contact means connected to said transducer for coupling said electric signals to said signal processing circuit.

4. An apparatus according to claim 2, wherein said piezoelectric means and said high pass filter are formed as a single unit.

5. An apparatus according to claim 2, wherein said amplifying means comprises a field effect control means having a control terminal and an output terminal, said control terminal coupled to said piezoelectric means and said output terminal coupled to a means for biasing said field effect control means.

6. An apparatus according to claim 5, wherein said field effect control means comprises a field effect transistor.

7. An apparatus according to claim 2, further including resistance and capacitive means, said resistance means coupled to said biasing means and said capacitive means coupled to said signal processing circuit.

* * * * *